United States Patent
Lin

(10) Patent No.: US 11,949,979 B2
(45) Date of Patent: Apr. 2, 2024

(54) IMAGE ACQUISITION METHOD WITH AUGMENTED REALITY ANCHOR, DEVICE, APPARATUS AND STORAGE MEDIUM

(71) Applicants: BEIJING XIAOMI MOBILE SOFTWARE CO., LTD. NANJING BRANCH, Nanjing (CN); BEIJING XIAOMI MOBILE SOFTWARE CO., LTD., Beijing (CN)

(72) Inventor: Xingsheng Lin, Beijing (CN)

(73) Assignees: BEIJING XIAOMI MOBILE SOFTWARE CO., LTD. NANJING BRANCH, Nanjing (CN); BEIJING XIAOMI MOBILE SOFTWARE CO., LTD., Beijing (CN)

( * ) Notice: Subject to any disclaimer, the term of this patent is extended or adjusted under 35 U.S.C. 154(b) by 349 days.

(21) Appl. No.: 17/274,419

(22) PCT Filed: May 28, 2020

(86) PCT No.: PCT/CN2020/092989
§ 371 (c)(1),
(2) Date: Mar. 8, 2021

(87) PCT Pub. No.: WO2021/237590
PCT Pub. Date: Dec. 2, 2021

(65) Prior Publication Data
US 2022/0201195 A1 Jun. 23, 2022

(51) Int. Cl.
*H04N 23/60* (2023.01)
*H04N 23/63* (2023.01)

(52) U.S. Cl.
CPC .......... *H04N 23/64* (2023.01); *H04N 23/635* (2023.01)

(58) Field of Classification Search
CPC .... G06F 3/0487; G06F 3/0482; G06F 3/0304; G06F 3/03547; G06F 3/011; G06T 7/73;
(Continued)

(56) References Cited

U.S. PATENT DOCUMENTS

2004/0189829 A1* 9/2004 Fukuda ................ H04N 23/634
348/E5.042
2010/0123737 A1* 5/2010 Williamson ............ G06T 15/20
345/672
(Continued)

FOREIGN PATENT DOCUMENTS

CN 102055906 A 5/2011
CN 102957859 A 3/2013
(Continued)

OTHER PUBLICATIONS

International Search Report in Application No. PCT/CN2020/092989, dated Mar. 3, 2021.
(Continued)

*Primary Examiner* — Usman A Khan
(74) *Attorney, Agent, or Firm* — Syncoda LLC; Feng Ma

(57) ABSTRACT

An image acquisition method includes: acquiring augmented reality (AR) anchor information in current scene in response to a first image acquisition instruction of a terminal device, an AR anchor to which the AR anchor information belongs being configured to indicate first image capturing information of a camera device when acquiring a sample image, and the first image capturing information including spatial coordinate information and/or orientation information; displaying the AR anchor in a viewing frame of the terminal device according to the AR anchor information; and performing image acquisition according to the first image capturing information indicated by the AR anchor. The AR anchor can be displayed to a user when the user takes photos
(Continued)

to assist the user in image acquisition according to the first image capturing information indicated by the AR anchor.

20 Claims, 9 Drawing Sheets

(58) Field of Classification Search
CPC ... G06T 11/00; G06T 2200/24; G06T 19/006; G06V 20/00; G05B 19/4183
USPC .......................................................... 348/633
See application file for complete search history.

(56) References Cited

U.S. PATENT DOCUMENTS

| | | | |
|---|---|---|---|
| 2011/0050909 A1* | 3/2011 | Ellenby | H04N 23/00 348/207.1 |
| 2011/0141141 A1* | 6/2011 | Kankainen | G01C 21/3647 348/E7.001 |
| 2011/0164163 A1* | 7/2011 | Bilbrey | H04N 21/2187 348/E5.022 |
| 2013/0040700 A1 | 2/2013 | Nishikawa | |
| 2013/0202154 A1* | 8/2013 | Hirano | G06T 7/246 382/103 |
| 2014/0049652 A1 | 2/2014 | Moon et al. | |
| 2019/0051019 A1* | 2/2019 | Kasahara | G06T 11/00 |
| 2019/0114061 A1* | 4/2019 | Daniels | G06F 3/011 |

FOREIGN PATENT DOCUMENTS

| | | |
|---|---|---|
| CN | 103595911 A | 2/2014 |
| CN | 104284074 A | 1/2015 |
| CN | 104301613 A | 1/2015 |
| CN | 105208266 A | 12/2015 |
| CN | 106791204 A | 5/2017 |
| CN | 107026966 A | 8/2017 |
| CN | 111182225 A | 5/2020 |
| IN | 105023266 A | 11/2015 |
| JP | 2009077157 A | 4/2009 |
| JP | 2009239397 A | 10/2009 |

OTHER PUBLICATIONS

Extended European Search Report (EESR) in Application No. EP 20853609.4 dated Apr. 22, 2022.

* cited by examiner

IMAGE ACQUISITION METHOD WITH AUGMENTED REALITY ANCHOR, DEVICE, APPARATUS AND STORAGE MEDIUM

CROSS-REFERENCE TO RELATED APPLICATIONS

The present application is a national stage of International Application No. PCT/CN2020/092989 filed on May 28, 2020, the disclosure of which is hereby incorporated by reference in its entirety.

TECHNICAL FIELD

The present disclosure relates to the field of image processing technology, and in particular, to an image acquisition method, device, apparatus, and storage medium.

BACKGROUND

With the development of smart terminal technology, users use smart terminals to take photos more frequently. With the frequency of taking photos and the popularity of social networks, the beauty of photos has also received more and more attention. In related technologies, camera hardware or algorithm is usually optimized to improve the photographing quality of the smart terminal device. However, such solution can only improve the photographing quality, and have limited improvement to the beauty of images, which cannot meet the needs of users.

SUMMARY

In order to solve the problems in the related art, embodiments of the present disclosure provide an image acquisition method, device, apparatus and storage medium to overcome the defects in the related art.

A first aspect of the embodiments of the present disclosure provides an image acquisition method, including:

acquiring augmented reality (AR) anchor information in current scene in response to a first image acquisition instruction of a terminal device, wherein an AR anchor to which the AR anchor information belongs is configured to indicate first image capturing information of a camera device when acquiring a sample image, and the first image capturing information includes spatial coordinate information and/or orientation information;

displaying the AR anchor in a viewing frame of the terminal device according to the AR anchor information; and performing image acquisition according to the first image capturing information indicated by the AR anchor.

In an embodiment, the first image capturing information further includes at least one of a filter type and a zoom factor.

In an embodiment, the AR anchor includes an AR viewing indicating frame; and the performing image acquisition according to the first image capturing information indicated by the AR anchor includes:

starting the camera device of the terminal device to perform the image acquisition in response to detecting that the viewing frame matches the AR viewing indicating frame.

In an embodiment, the performing image acquisition according to the first image capturing information indicated by the AR anchor includes:

starting a countdown of a preset time duration in response to detecting that second image capturing information of the terminal device matches the first image capturing information; and acquiring image information in the viewing frame of the terminal device after the countdown ends.

In an embodiment, the performing image acquisition according to the first image capturing information indicated by the AR anchor includes:

generating image acquisition reminding information in response to detecting that second image capturing information of the terminal device matches the first image capturing information;

receiving a second image acquisition instruction returned according to the image acquisition reminding information; and starting the camera device of the terminal device to perform the image acquisition in response to the second image acquisition instruction.

In an embodiment, the image acquisition reminding information includes at least one of sound, vibration, highlighting a camera key, and displaying the camera key at a preset position.

In an embodiment, the method further includes:

generating prompt information, the prompt information being configured to inquire whether to display the AR anchor; and performing the operation of displaying the AR anchor in a viewing frame of the terminal device according to the AR anchor information in response to receiving a display instruction for displaying the AR anchor.

In an embodiment, the acquiring augmented reality (AR) anchor information in current scene includes:

acquiring scene information of the current scene where the terminal device is located, wherein the scene information includes geographic location information;

sending a request for obtaining the AR anchor information to a server side, wherein the request includes the scene information; and receiving the AR anchor information returned by the server side according to the request.

In an embodiment, the scene information further includes at least one of time, light intensity information, and data stream of the viewing frame; and the AR anchor information includes at least one of AR anchor display form, identifier of application package to be jumped to, display coordinate of the AR anchor in the viewing frame, prompt manner, and reminding manner of displaying image acquisition.

In an embodiment, the method further includes configuring the scene information according to steps of:

receiving a scene configuration instruction, wherein the configuration instruction is configured to configure the scene information for acquiring the AR anchor information;

generating an association relationship between each piece of the scene information and the AR anchor information according to the configuration instruction; and configuring the scene information according to the association relationship.

A second aspect of the present disclosure provides an image acquisition method, including:

receiving a request sent by a terminal device for obtaining AR anchor information, wherein the request includes scene information of a current scene where the terminal device is located, and the scene information includes geographic location information;

determining the AR anchor information associated with the scene information, wherein an AR anchor to which the AR anchor information belongs is configured to indicate first image capturing information of a camera device when acquiring a sample image, and the first image capturing information includes spatial coordinate information and/or orientation information; and sending the AR anchor information to the terminal device.

In an embodiment, the first image capturing information further includes at least one of a filter type and a zoom factor.

In an embodiment, the method further includes configuring the scene information according to steps of:

receiving a scene configuration instruction, wherein the configuration instruction is configured to configure the scene information for acquiring the AR anchor information;

generating an association relationship between each piece of the scene information and the AR anchor information according to the configuration instruction; and configuring the scene information according to the association relationship.

A third aspect of the present disclosure provides an image acquisition device, including:

an information acquisition module, configured to acquire augmented reality (AR) anchor information in current scene in response to a first image acquisition instruction of a terminal device, wherein an AR anchor to which the AR anchor information belongs is configured to indicate first image capturing information of a camera device when acquiring a sample image, and the first image capturing information includes spatial coordinate information and/or orientation information;

an anchor display module, configured to display the AR anchor in a viewing frame of the terminal device according to the AR anchor information; and an image acquisition module, configured to perform image acquisition according to the first image capturing information indicated by the AR anchor.

In an embodiment, the first image capturing information further includes at least one of a filter type and a zoom factor.

In an embodiment, the AR anchor includes an AR viewing indicating frame; and the image acquisition module is further configured to start the camera device of the terminal device to perform the image acquisition in response to detecting that the viewing frame matches the AR viewing indicating frame.

In an embodiment, the image acquisition module includes:

a countdown start unit, configured to start a countdown of a preset time duration in response to detecting that second image capturing information of the terminal device matches the first image capturing information; and an image acquisition unit, configured to acquire image information in the viewing frame of the terminal device after the countdown ends.

In an embodiment, the image acquisition module includes:

an information generating unit, configured to generate image acquisition reminding information in response to detecting that second image capturing information of the terminal device matches the first image capturing information;

an instruction receiving unit, configured to receive a second image acquisition instruction returned according to the image acquisition reminding information; and an image acquisition unit, configured to start the camera device of the terminal device to perform the image acquisition in response to the second image acquisition instruction.

In an embodiment, the image acquisition reminding information includes at least one of sound, vibration, highlighting a camera key, and displaying the camera key at a preset position.

In an embodiment, the device further includes:

a prompt generation module, configured to generate prompt information, the prompt information being configured to inquire whether to display the AR anchor; and the anchor display module is further configured to perform the operation of displaying the AR anchor in the viewing frame of the terminal device according to the AR anchor information in response to receiving a display instruction for displaying the AR anchor.

In an embodiment, the information acquisition module includes:

a location information acquiring unit, configured to acquire scene information of the current scene where the terminal device is located, wherein the scene information includes geographic location information;

an anchor request sending unit, configured to send a request for obtaining the AR anchor information to a server side, wherein the request includes the scene information; and an anchor information receiving unit, configured to receive the AR anchor information returned by the server side according to the request.

In an embodiment, the scene information further includes at least one of time, light intensity information, and data stream of the viewing frame; and the AR anchor information includes at least one of AR anchor display form, identifier of application package to be jumped to, display coordinate of the AR anchor in the viewing frame, prompt manner, and reminding manner of displaying image acquisition.

In an embodiment, the device further includes a scene information configuration module; and the scene information configuration module includes:

a configuration instruction receiving unit, configured to receive a scene configuration instruction, wherein the configuration instruction is configured to configure the scene information for acquiring the AR anchor information;

an association relationship generating unit, configured to generate an association relationship between each piece of the scene information and the AR anchor information according to the configuration instruction; and a scene information configuring unit, configured to configure the scene information according to the association relationship.

A fourth aspect of the present disclosure provides an image acquisition device, including:

an anchor request receiving module, configured to receive a request sent by a terminal device for obtaining AR anchor information, wherein the request includes scene information of a current scene where the terminal device is located, and the scene information includes geographic location information;

an anchor information determining module, configured to determine the AR anchor information associated with the scene information, wherein an AR anchor to which the AR anchor information belongs is configured to indicate first image capturing information of a camera device when acquiring a sample image, and the first image capturing information includes spatial coordinate information and/or orientation information; and an anchor information sending module, configured to send the AR anchor information to the terminal device.

In an embodiment, the first image capturing information further includes at least one of a filter type and a zoom factor.

In an embodiment, the device further includes a scene information configuration module; and the scene information configuration module includes:

a configuration instruction receiving unit, configured to receive a scene configuration instruction, wherein the configuration instruction is configured to configure the scene information for acquiring the AR anchor information;

an association relationship generating unit, configured to generate an association relationship between each piece of the scene information and the AR anchor information according to the configuration instruction; and a scene information configuring unit, configured to configure the scene information according to the association relationship.

A fifth aspect of the present disclosure provides an electronic apparatus, including:

a processor; and a memory for storing executable instructions of the processor, wherein the processor is configured to:

acquire augmented reality (AR) anchor information in current scene in response to a first image acquisition instruction of a terminal device, wherein an AR anchor to which the AR anchor information belongs is configured to indicate first image capturing information of a camera device when acquiring a sample image, and the first image capturing information includes spatial coordinate information and/or orientation information;

display the AR anchor in a viewing frame of the terminal device according to the AR anchor information; and perform image acquisition according to the first image capturing information indicated by the AR anchor.

A sixth aspect of the present disclosure provides a computer-readable storage medium having a computer program stored thereon, wherein the following steps are implemented when the program is executed by a processor:

acquiring augmented reality (AR) anchor information in current scene in response to a first image acquisition instruction of a terminal device, wherein an AR anchor to which the AR anchor information belongs is configured to indicate first image capturing information of a camera device when acquiring a sample image, and the first image capturing information includes spatial coordinate information and/or orientation information;

displaying the AR anchor in a viewing frame of the terminal device according to the AR anchor information; and performing image acquisition according to the first image capturing information indicated by the AR anchor.

The technical solution provided by the embodiments of the present disclosure may have the following beneficial effects.

In the present disclosure, augmented reality (AR) anchor information in current scene is acquired in response to a first image acquisition instruction of a terminal device, wherein an AR anchor to which the AR anchor information belongs is configured to indicate first image capturing information of a camera device when acquiring a sample image, and the first image capturing information includes spatial coordinate information and/or orientation information; then the AR anchor is displayed in a viewing frame of the terminal device according to the AR anchor information; and then image acquisition may be performed according to the first image capturing information indicated by the AR anchor. Therefore, the AR anchor is displayed to a user when the user takes photos, which can assist the user in image acquisition according to the first image capturing information indicated by the AR anchor, and thus facilitates the user to acquire more beautiful images to meet the needs of the user for obtaining high-quality images.

BRIEF DESCRIPTION OF THE DRAWINGS

The drawings herein are incorporated into the specification and constitute a part of the specification, show embodiments conforming to the present disclosure, and serve to, together with the specification, explain the principle of the present disclosure.

DETAILED DESCRIPTION

Exemplary embodiments will be described in detail herein, examples of which are shown in the accompanying drawings. When the following description refers to the drawings, unless otherwise indicated, the same reference numbers in different drawings indicate the same or similar elements. The embodiments described in the following exemplary embodiments do not represent all embodiments consistent with the present disclosure. Rather, they are merely examples of devices and methods consistent with some aspects of the present disclosure as recited in the appended claims.

Figure 1:
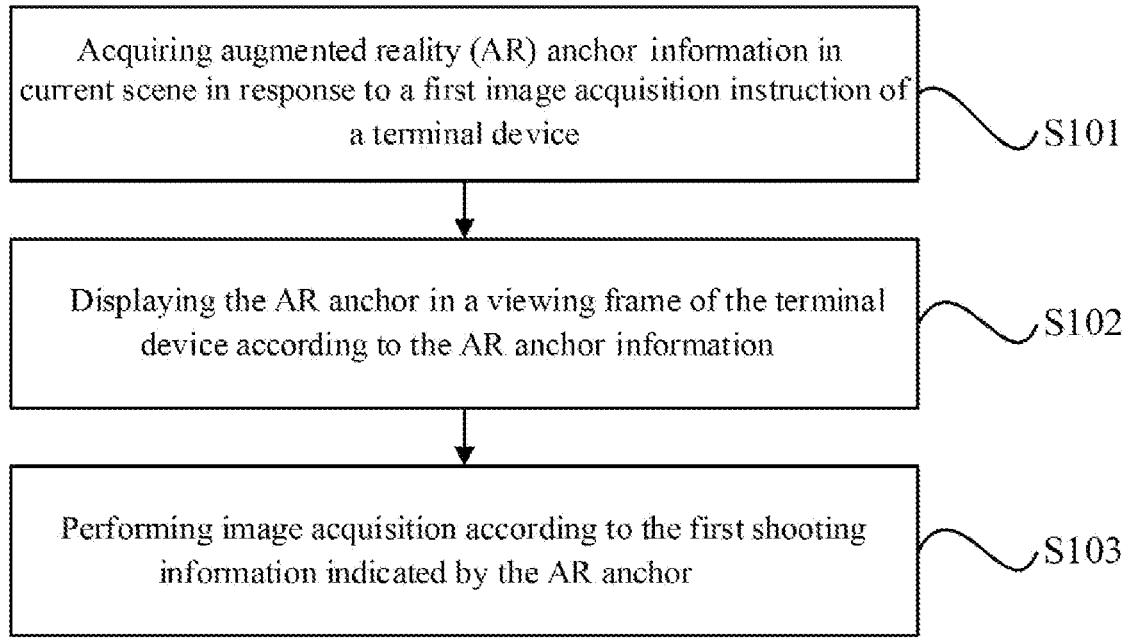
FIG. 1 is a flow chart showing an image acquisition method according to an exemplary embodiment.

FIG. 1 is a flowchart showing an image acquisition method according to a first exemplary embodiment. The image acquisition method of the embodiment may be applied to a terminal device (for example, a smart phone, a smart camera, a tablet computer, a wearable device and the like). As shown in FIG. 1, the method includes the following steps S101-S103.

In step S101, augmented reality (AR) anchor information in current scene is acquired in response to a first image acquisition instruction of a terminal device.

For example, when taking photos with a terminal device, a user may trigger an operation of opening a camera application in the terminal device, and then the terminal device may acquire an augmented reality (AR) anchor information in a current scene in response to a first image acquisition instruction of the terminal device.

An AR anchor to which the AR anchor information belongs is configured to indicate first image capturing information of a camera device when acquiring a sample image, and the first image capturing information includes spatial coordinate information and/or orientation information. For examiner, the spatial coordinate information and/or orientation information is spatial coordinate information and/or orientation information of a camera device that was used by other users before to acquire the sample image, and for example, the orientation information is a image capturing direction of the camera device, etc.

For example, the content of the above AR anchor may be set by a developer or user according to actual needs, for example, may be set to be at least one of a cloud anchor, a photo, a text description, and a graphic mark, which is not limited in the embodiment.

In an embodiment, the content of the above AR anchor information may be identification information of the AR anchor to which the AR anchor information belongs, such as identification, number and the like, which is not limited in the embodiment.

In another embodiment, the content of the above AR anchor information may refer to the embodiment shown in FIG. 5 below, which is described later in detail.

In the embodiment, the terminal device may obtain the AR anchor information in the current scene from a local storage space. Alternatively, the AR anchor information in the current scene may also be obtained from a server side. A specific obtaining method may refer to the embodiment shown in FIG. 5, which will be described later in detail.

In step S102, the AR anchor is displayed in a viewing frame of the terminal device according to the AR anchor information.

In the embodiment, the AR anchor may be displayed in the viewing frame of the terminal device according to the AR anchor information after the augmented reality (AR) anchor information in the current scene is acquired.

For example, after the augmented reality (AR) anchor information in the current scene is acquired, the AR anchor to which the AR anchor information belongs may be determined, and then may be displayed in the view frame of the terminal device based on the augmented reality technology.

It shall be illustrated that there may be one or more scenes in the viewing frame of the terminal device, therefore, there may be different AR anchors for each scene. The AR anchor is configured to indicate image capturing information of the camera device when acquiring the sample image of a corresponding scene.

It shall be illustrated that the manner of displaying the AR anchor in the view frame of the terminal device based on the augmented reality technology may refer to the related technology, which is not limited in the embodiment.

In step S103, image acquisition is performed according to the first image capturing information indicated by the AR anchor.

In the embodiment, after the AR anchor is displayed in the viewing frame of the terminal device according to the AR anchor information, image acquisition may be performed according to the first image capturing information indicated by the AR anchor.

For example, after the AR anchor is displayed in the viewing frame of the terminal device, the user may adjust the image capturing information of the terminal device according to the AR anchor, for example, may adjust the spatial coordinate information and/or orientation information of the terminal device and the like, and then the image information in the current viewing frame may be acquired after the image capturing information is adjusted.

In an embodiment, the above AR anchor may further include an AR viewing indicating frame. The AR viewing indicating frame therein may include a sample image corresponding to the AR anchor. On such basis, the terminal device may start the camera device of the terminal device to perform the image acquisition in response to detecting that the viewing frame matches the AR viewing indicating frame.

For example, the user may be reminded to adjust the image capturing information of the terminal device, such as the spatial coordinate information and/or orientation information of the terminal device, according to the displayed AR anchor, to make the viewing frame of the terminal device and the AR viewing indicating frame coincide with each other, so that the camera device of the terminal device may be started to perform image acquisition.

In an embodiment, the above first image capturing information may further include at least one of a filter type and a zoom factor.

As can be seen from the above description, in the embodiments, augmented reality (AR) anchor information in current scene is acquired in response to a first image acquisition instruction of a terminal device, wherein an AR anchor to which the AR anchor information belongs is configured to indicate first image capturing information of a camera device when acquiring a sample image, and the first image capturing information includes spatial coordinate information and/or orientation information; the AR anchor is displayed in a viewing frame of the terminal device according to the AR anchor information; and then image acquisition may be performed according to the first image capturing information indicated by the AR anchor. Therefore, the AR anchor is displayed to a user when the user takes photos, which can assist the user in image acquisition according to the first image capturing information indicated by the AR anchor, and thus facilitates the user to acquire more beautiful images to meet the needs of the user for obtaining high-quality images.

Figure 2:
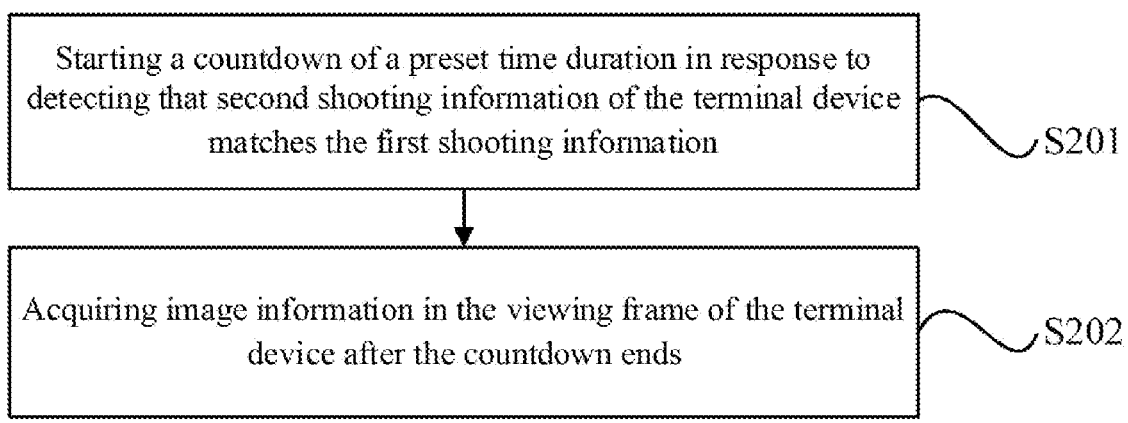
FIG. 2 is a flowchart showing how to perform image acquisition according to first image capturing information indicated by the AR anchor according to an exemplary embodiment.

FIG. 2 is a flowchart showing how to perform the image acquisition according to the first image capturing information indicated by the AR anchor according to an exemplary embodiment. The embodiment illustrates how to perform the image acquisition according to the first image capturing information indicated by the AR anchor on the basis of the above-mentioned embodiments.

As shown in FIG. 2, the above step 103 of performing the image acquisition according to the first image capturing information indicated by the AR anchor may include the following steps S201-S202.

In step S201, a countdown of a preset time duration is started in response to detecting that second image capturing information of the terminal device matches the first image capturing information.

The second image capturing information includes spatial coordinate information and/or orientation information of the camera device of the terminal device.

In the embodiment, after the AR anchor is displayed in the viewing frame of the terminal device according to the AR anchor information, the user may adjust the second image capturing information of the terminal device so that the second image capturing information matches the above first image capturing information. Therefore, the terminal device may start a countdown of a preset time duration, such as a countdown progress bar of 3 seconds, in response to detecting that second image capturing information of the terminal device matches the first image capturing information, which is not limited in the embodiment.

In step S202, image information in the viewing frame of the terminal device is acquired after the countdown ends.

In the embodiment, after the countdown of the preset time duration is started, if the ending of the countdown is detected, the image information in the viewing frame of the terminal device may be acquired.

It can be seen from the above description that, in the embodiment, a countdown of a preset time duration is started in response to detecting that second image capturing information of the terminal device matches the first image capturing information; and image information in the viewing frame of the terminal device is acquired after the countdown ends, which can realize automatic image acquisition according to the second image capturing information matching the first image capturing information and the setting of the countdown. The user does not need to manually trigger an image acquisition button, which can prevent the adjusted second image capturing information from being changed due to the pressing of the button. This can assist the user in image acquisition according to the first image capturing information indicated by the AR anchor, and thus facilitates the user to acquire more beautiful images to meet the needs of the user for obtaining high-quality images.

Figure 3:
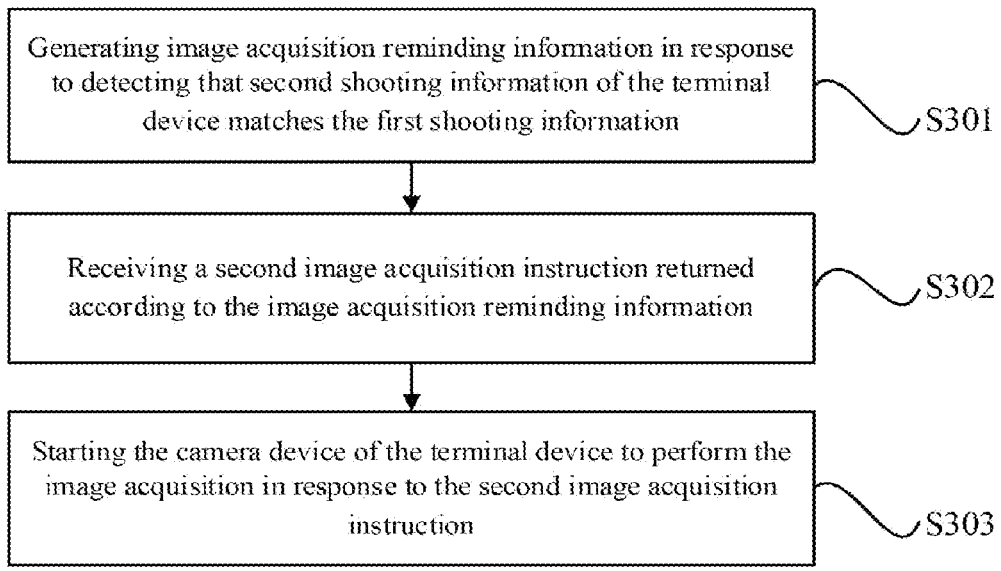
FIG. 3 is a flowchart showing how to perform image acquisition based on first image capturing information indicated by the AR anchor according to yet another exemplary embodiment.

FIG. 3 is a flowchart showing how to perform the image acquisition according to the first image capturing information indicated by the AR anchor according to an exemplary embodiment. The embodiment illustrates how to perform the image acquisition according to the first image capturing information indicated by the AR anchor on the basis of the above-mentioned embodiments.

As shown in FIG. 3, the above step 103 of performing the image acquisition according to the first image capturing information indicated by the AR anchor may include the following steps S301-S303.

In step S301, image acquisition reminding information is generated in response to detecting that second image capturing information of the terminal device matches the first image capturing information.

The second image capturing information includes spatial coordinate information and/or orientation information of the camera device of the terminal device.

In the embodiment, after the AR anchor is displayed in the viewing frame of the terminal device according to the AR anchor information, the user may adjust the second image capturing information of the terminal device so that the second image capturing information matches the above first image capturing information. Therefore, the terminal device may generate image acquisition reminding information, such as at least one of sound, vibration, highlighting a camera key, and displaying the camera key at a preset position, in response to detecting that the second image capturing information of the terminal device matches the first image capturing information, which is not limited in the embodiment.

In step S302, a second image acquisition instruction returned according to the image acquisition reminding information is received.

In the embodiment, after the image acquisition reminding information is generated in response to detecting that the second image capturing information of the terminal device matches the first image capturing information, a second image acquisition instruction returned according to the image acquisition reminding information may be received.

For example, after the terminal device generates the image acquisition reminding information, the user may return the second image acquisition instruction according to the image acquisition reminding information, and then the terminal device may receive the second image acquisition instruction.

In step S303, the camera device of the terminal device is started to perform the image acquisition in response to the second image acquisition instruction.

In the embodiment, after receiving the second image acquisition instruction returned according to the image acquisition reminding information, the terminal device may start the camera device of the terminal device to perform the image acquisition in response to the second image acquisition instruction.

For example, after the image acquisition reminding information is generated, if the second image acquisition instruction returned by the user according to the image acquisition reminding information is received, the camera device of the terminal device may be started to perform the image acquisition.

As can be seen from the above description that, in the embodiment, image acquisition reminding information is generated in response to detecting that second image capturing information of the terminal device matches the first image capturing information; a second image acquisition instruction returned according to the image acquisition reminding information is received; and then the camera device of the terminal device is started to perform the image acquisition in response to the second image acquisition instruction, which can realize the image acquisition according to the second image capturing information matching the first image capturing information and the second image acquisition instruction returned by the user based on the image acquisition reminding information, and thus can realize the image acquisition according to user needs. This can assist the user in image acquisition according to the first image capturing information indicated by the AR anchor, and thus facilitates the user to acquire more beautiful images to meet the needs of the user for obtaining high-quality images.

Figure 4:
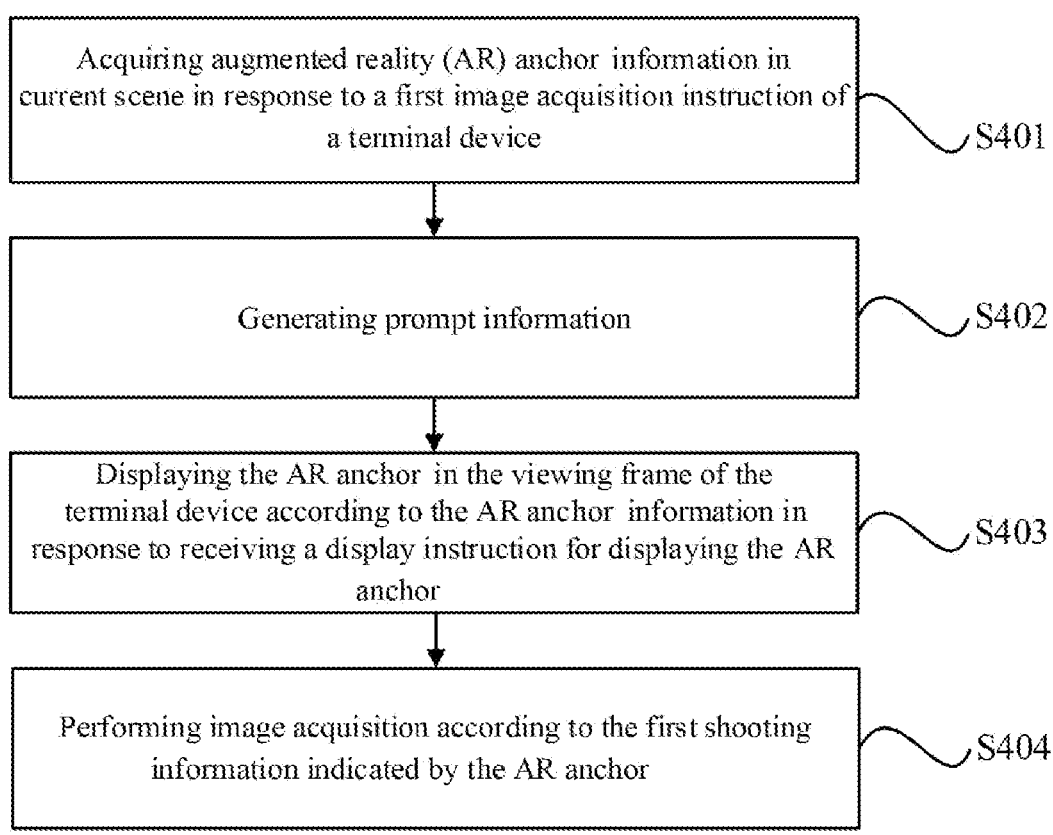
FIG. 4 is a flow chart showing an image acquisition method according to yet another exemplary embodiment.

FIG. 4 is a flowchart showing an image acquisition method according to a first exemplary embodiment. The image acquisition method of the embodiment may be applied to a terminal device (for example, a smart phone, a smart camera, a tablet computer, a wearable device and the like). As shown in FIG. 4, the method includes the following steps S401-S404.

In step S401, augmented reality (AR) anchor information in current scene is acquired in response to a first image acquisition instruction of a terminal device.

In step S402, prompt information for inquiring whether to display the AR anchor is generated.

In the embodiment, after the augmented reality (AR) anchor information in the current scene is acquired, in order to determine whether the user needs to display the AR anchor, prompt information may be generated to inquire the user whether to display the acquired AR anchor through the prompt information.

It shall be illustrated that the content and form of the above prompt information may be freely set by a developer according to actual needs, for example, may be set to be at least one of sound, vibration, and virtual key, which is not limited in the embodiment.

In step S403, the AR anchor is displayed in the viewing frame of the terminal device according to the AR anchor information, in response to receiving a display instruction for displaying the AR anchor.

In the embodiment, after the prompt information for inquiring whether to display the AR anchor is generated, if the terminal device receives the display instruction for displaying the AR anchor, the AR anchor may be displayed in the viewing frame of the terminal device according to the AR anchor information.

In step S404, image acquisition is performed according to the first image capturing information indicated by the AR anchor.

Relevant explanations and descriptions of steps S401 and S403-S404 may be referred to the above-mentioned embodiments, which will not be repeated herein.

As can be seen from the above description that, in the embodiment, augmented reality (AR) anchor information in current scene is acquired in response to a first image acquisition instruction of a terminal device, wherein an AR anchor to which the AR anchor information belongs is configured to indicate first image capturing information of a camera device when acquiring a sample image, and the first image capturing information includes spatial coordinate information and/or orientation information; then prompt information is generated; and the AR anchor is displayed in the viewing frame of the terminal device according to the AR anchor information, in response to receiving a display instruction for displaying the AR anchor; prompt information for inquiring whether to display the AR anchor is generated; and then image acquisition is performed according to the first image capturing information indicated by the AR anchor. The AR anchor is displayed to the user based on the display instruction of the user, which can assist the user in image acquisition according to the first image capturing information indicated by the AR anchor, and thus facilitates the user to acquire more beautiful images to meet the needs of the user for obtaining high-quality images.

Figure 5:
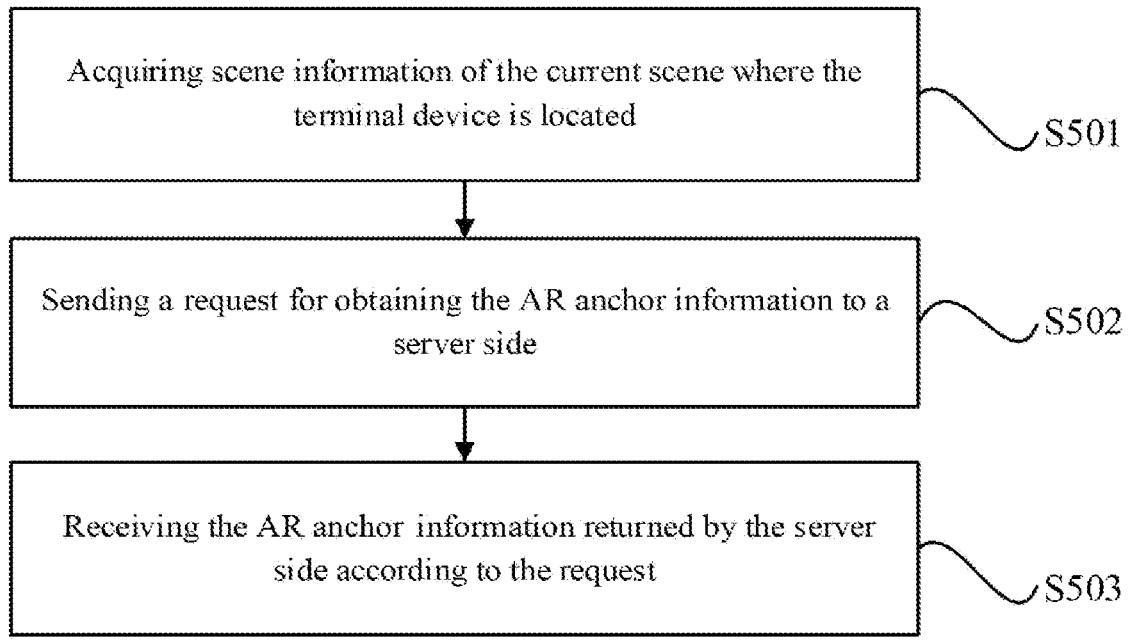
FIG. 5 is a flowchart showing how to acquire AR anchor information in a current scene according to an exemplary embodiment.

FIG. 5 is a flowchart showing how to acquire the AR anchor information in the current scene according to an exemplary embodiment. The embodiment illustrates how to acquire the AR anchor information in the current scene on the basis of the above-mentioned embodiments. As shown in FIG. 5, the above step 101 of acquiring the augmented reality (AR) anchor information in the current scene may include the following steps S501-S503.

In step S501, scene information of the current scene where the terminal device is located is acquired.

In the embodiment, after receiving the first image acquisition instruction, the terminal device may acquire the scene information of the current scene where the terminal device is located.

The scene information may include geographic location information of the terminal device.

For example, the geographic location information of the terminal device may be obtained through a built-in global positioning system (GPS) module of the terminal device.

It shall be illustrated that in addition to obtaining the geographic location information through the built-in GPS module of the terminal device, a developer or user may use other methods to obtain the geographic location information of the terminal device according to actual business needs, and the results obtained thereby can be also applicable in the subsequent steps, which is not limited in the embodiment.

In step S502, a request for obtaining the AR anchor information is sent to a server side.

In the embodiment, after the scene information of the current scene where the terminal device is located is obtained, the request for obtaining the AR anchor information may be sent to the server side. The request includes the scene information.

For example, the terminal device may send, in response to the first image acquisition instruction, the request for acquiring the AR anchor information to the server side according to the scene information of the current scene.

In an embodiment, the scene information may further include at least one of time, light intensity information, and data stream of the viewing frame.

On such basis, the AR anchor information includes: at least one of AR anchor display form, identifier of application package to be jumped to, display coordinate of the AR anchor in the viewing frame, prompt manner, and reminding manner of displaying image acquisition.

The above-mentioned AR anchor display form may include text, picture and video of a preset content, a preset personage/object model or the like.

The above application package to be jumped to may include an AR map etc. For example, when a user sees the AR anchor of a target scene on the terminal device, and is interested in relevant information of the target scene (such as historical background, character introduction and the like), he/she can trigger a jump to the above AR map to obtain the information that he/she is interest in.

The above display coordinates of the AR anchor in the viewing frame may include the coordinates of the AR anchor in a coordinate system corresponding to a camera interface.

The above-mentioned prompt manner may include a reminding manner of the AR anchor on the camera interface, such as a prompt tab that can be clicked by the user, which is not limited in the embodiment.

In step S503, the AR anchor information returned by the server side according to the request is received.

In the embodiment, after the request for acquiring the AR anchor information is sent to the server side, the server side can find out the AR anchor information associated with the above scene information according to the request, and then can return the AR anchor information to the terminal device.

In another embodiment, an association manner between the above scene information and the AR anchor information may be referred to the embodiment shown in FIG. 6 below, which is described later in detail.

It can be seen from the above description that in the embodiment, scene information of the current scene where the terminal device is located is acquired, wherein the scene information includes geographic location information; a request for obtaining the AR anchor information is sent to a server side, wherein the request includes the scene information; and then the AR anchor information returned by the server side according to the request is received, which can provide accurate reference for subsequently displaying the AR anchor in the viewing frame of the terminal device according to the AR anchor information. This can realize performing image acquisition according to the first image capturing information indicated by the AR anchor, and thus facilitates the user to acquire more beautiful images to meet the needs of the user for obtaining high-quality images.

Figure 6:
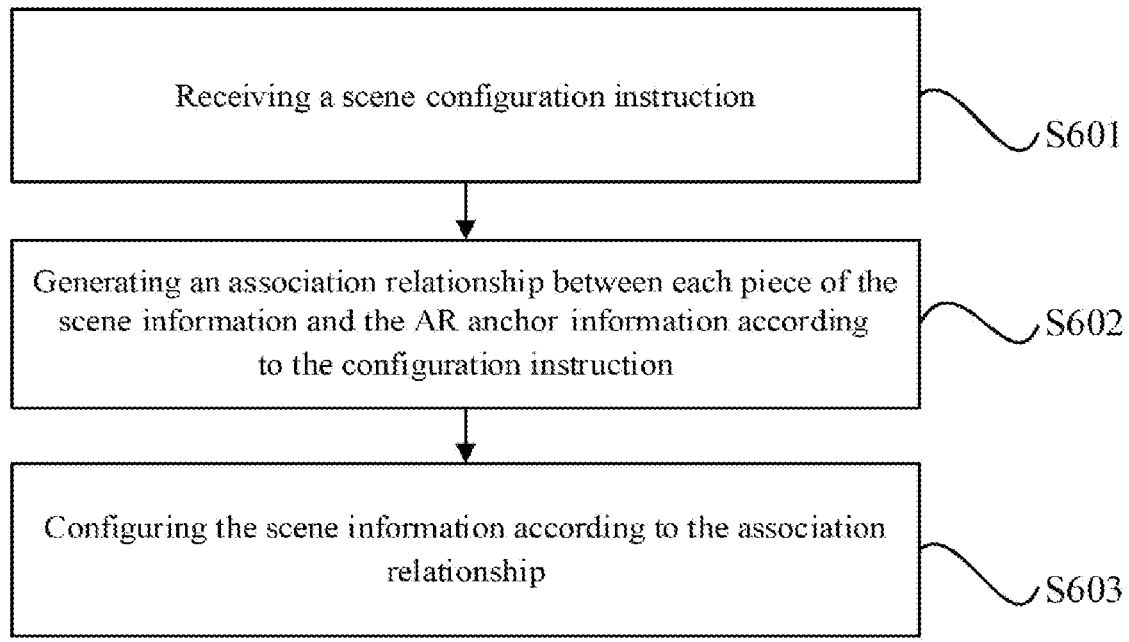
FIG. 6 is a flowchart showing how to configure the scene information according to an exemplary embodiment.

FIG. 6 is a flowchart showing how to configure the scene information according to an exemplary embodiment. The embodiment illustrates how to configure the scene information on the basis of the above-mentioned embodiments. As shown in FIG. 6, the method of the embodiment may further include configuring the scene information according to the following steps S601-S603.

In step S601, a scene configuration instruction is received.

The configuration instruction is configured to configure the scene information for acquiring the AR anchor information.

In the embodiment, when the user configures the scene information for acquiring the AR anchor through the terminal device, the scene configuration instruction can be triggered through a configuration interface displayed in the user interface, and then the terminal device can receive the scene configuration instruction.

In step S602, an association relationship between each piece of the scene information and the AR anchor information is generated according to the configuration instruction.

In the embodiment, after receiving the scene configuration instruction, the terminal device may generate the association relationship between each piece of the scene information and the AR anchor information according to the configuration instruction.

For example, an association relationship table may be constructed for the scene information specified by the terminal device or the current scene information of the terminal device, and then the AR anchor may be generated at a specified position in the scene, and the anchor information of the AR anchor is added to the association relationship table of the scene information for subsequently acquiring the AR anchor information through the table.

In step S603, the scene information is configured according to the association relationship.

In the embodiment, after the association relationship between each of the scene information and the AR anchor information is generated according to the configuration instruction, the scene information may be configured according to the association relationship.

It can be seen from the above description that in the embodiment, a scene configuration instruction is received; an association relationship between each piece of the scene information and the AR anchor information is generated according to the configuration instruction; and the scene information is configured according to the association relationship, which can provide basis for subsequently send a request for acquiring the AR anchor information to the server side according to the scene information. This can realize receiving the AR anchor information returned by the server side according to the request, which is beneficial to subsequently improving the quality of the acquired image information to meet the needs of the user for obtaining high-quality images.

Figure 7:
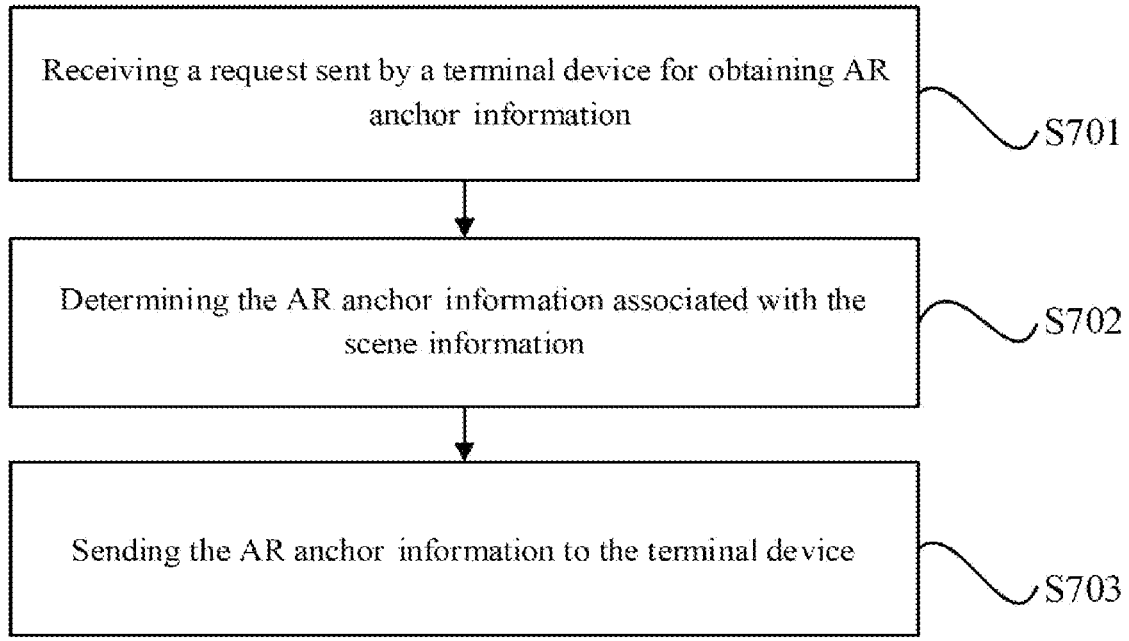
FIG. 7 is a flow chart showing an image acquisition method according to an exemplary embodiment.

FIG. 7 is a flowchart of an image acquisition method according to an exemplary embodiment. The image acquisition method of the embodiment can be applied to a server side (e.g., a server, or a server cluster including a plurality of servers). As shown in FIG. 7, the method includes the following steps S701-S703.

In step S701, a request sent by a terminal device for obtaining AR anchor information is received.

The request includes scene information of a current scene where the terminal device is located, and the scene information includes geographic location information.

In the embodiment, after receiving first image acquisition instruction, the terminal device can obtain the scene information of a current scene in which the terminal device is located, and then can send the request for obtaining the AR anchor information to the server side according to the scene information.

In step S702, the AR anchor information associated with the scene information is determined.

An AR anchor to which the AR anchor information belongs is configured to indicate first image capturing information of a camera device when acquiring a sample image, and the first image capturing information including spatial coordinate information and/or orientation information.

In the embodiment, after receiving the request for acquiring the AR anchor information sent by the terminal device, the server side can determine the AR anchor information associated with the scene information.

For example, the server side may query the AR anchor information associated with the scene information according to a pre-constructed association relationship.

In another embodiment, the manner of constructing the above association relationship may refer to the embodiment shown in FIG. 8 below, which is described in detail later.

In step S703, the AR anchor information is sent to the terminal device.

In the embodiment, after determining the AR anchor information associated with the scene information, the server side may send the AR anchor information to the terminal device.

In an embodiment, the above first image capturing information may further include at least one of a filter type and a zoom factor.

As can be seen from the above description that, in the embodiment, a request sent by a terminal device for obtaining AR anchor information is received; the AR anchor information associated with the scene information is determined; and then the AR anchor information sent to the terminal device, which can provide accurate reference for the terminal to subsequently display the AR anchor in the viewing frame of the terminal device according to the AR anchor information. This can realize performing image acquisition according to the first image capturing information indicated by the AR anchor, and thus facilitates the user to acquire more beautiful images to meet the needs of the user for obtaining high-quality images.

Figure 8:
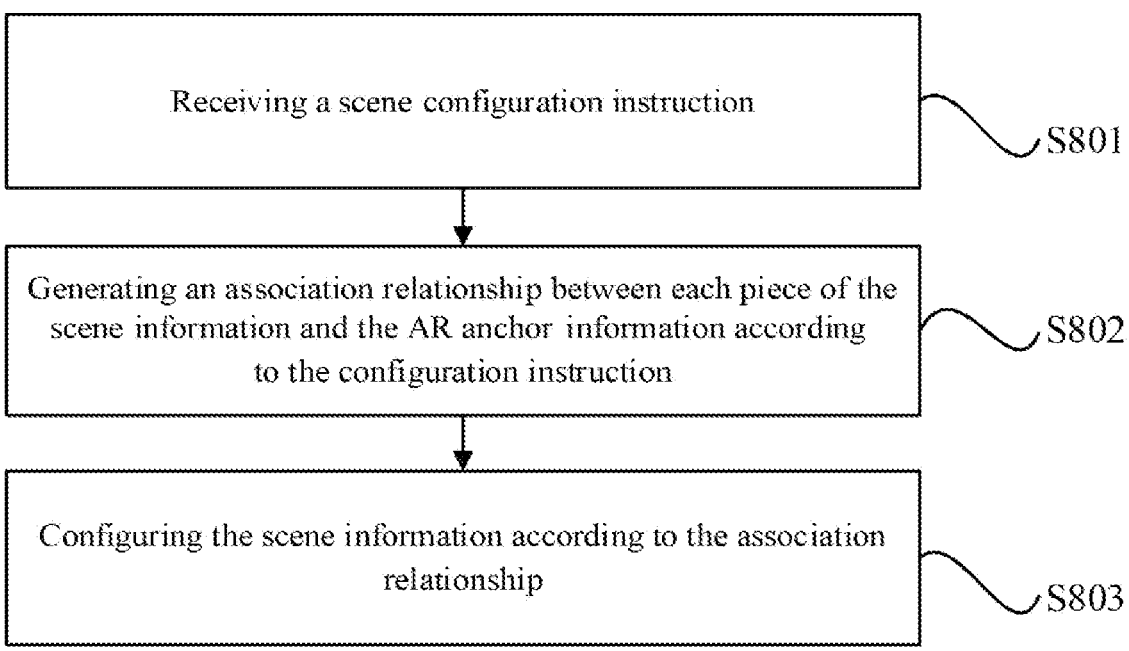
FIG. 8 is a flowchart showing how to configure the scene information according to an exemplary embodiment.

FIG. 8 is a flowchart showing how to configure the scene information according to an exemplary embodiment. The embodiment illustrates how to configure the scene information on the basis of the above-mentioned embodiments. As shown in FIG. 8, the method of the embodiment may further include configuring the scene information according to the following steps S801-S803.

In step S801, a scene configuration instruction is received.

The configuration instruction is configured to configure the scene information for acquiring the AR anchor information.

In the embodiment, when the user obtains the scene information of the AR anchor through the server side configuration, the scene configuration instruction can be triggered through a configuration interface displayed on a user interface, and then the server side can receive the scene configuration instruction.

In step S802, an association relationship between each piece of the scene information and the AR anchor information is generated according to the configuration instruction.

In the embodiment, after receiving the scene configuration instruction, the server side can generate the association relationship between each of the scene information and the AR anchor information according to the configuration instruction.

For example, an association relationship table may be constructed for the scene information specified by the server side or the current scene information of the server side, and then the AR anchor may be generated at a specified position in the scene, and the anchor information of the AR anchor is added to the association relationship table of the scene information for subsequently acquiring the AR anchor information through the table.

In step S803, the scene information is configured according to the association relationship.

In the embodiment, after the association relationship between each of the scene information and the AR anchor information is generated according to the configuration instruction, the scene information may be configured according to the association relationship.

It can be seen from the above description that in the embodiment, a scene configuration instruction is received; an association relationship between each piece of the scene information and the AR anchor information is generated according to the configuration instruction; and then the scene information is configured according to the association relationship, which can provide basis for subsequently acquiring the AR anchor information according to the scene information and sending the AR anchor information to the terminal device. This is beneficial for the terminal device to subsequently improving the quality of the acquired image information to meet the needs of the user for obtaining high-quality images.

Figure 9:
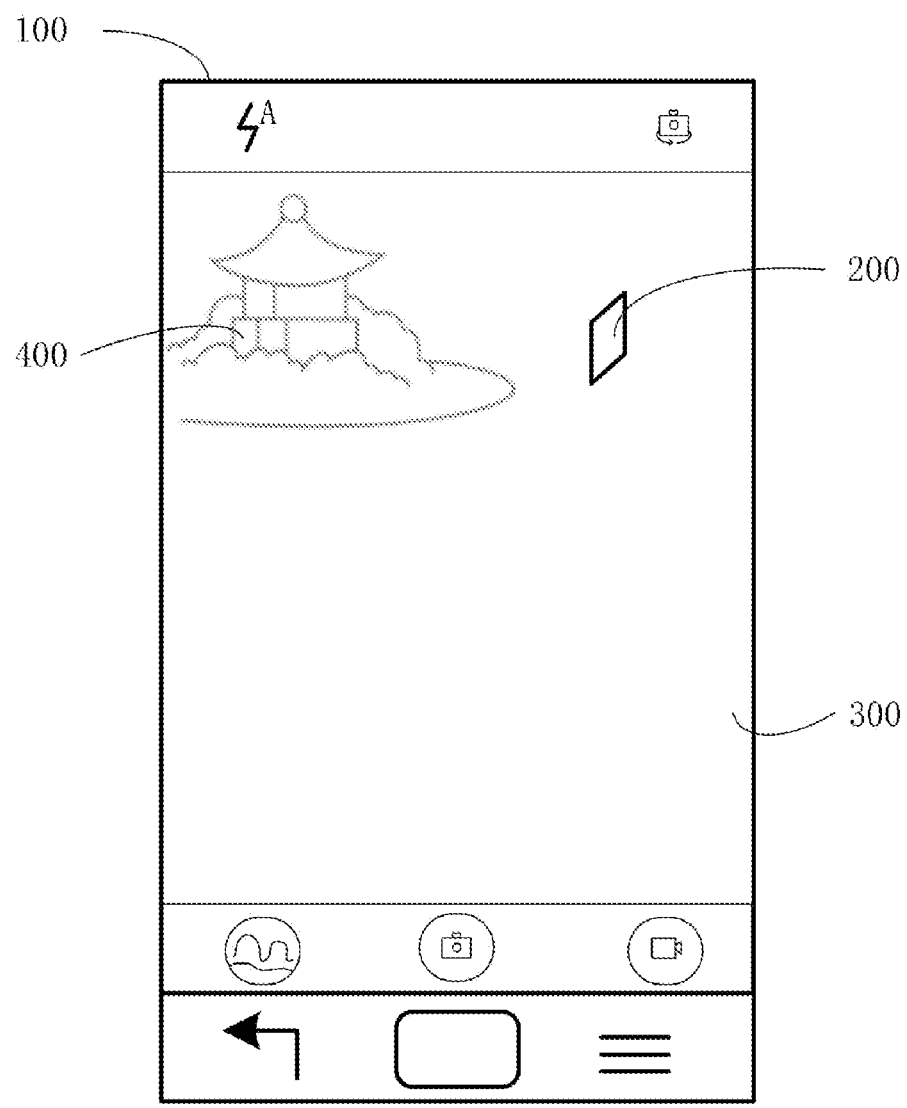
FIG. 9 is a schematic diagram showing an application scene of an image acquisition method according to an exemplary embodiment.

FIG. 9 is a schematic diagram showing an application scene of an image acquisition method according to an exemplary embodiment. As shown in FIG. 9, when receiving a first image acquisition instruction, a terminal device 100 can acquire augmented reality (AR) anchor information in a current scene in response to the first image acquisition instruction. An AR anchor to which the AR anchor information belongs is configured to indicate first image capturing information of a camera device when acquiring a sample image, and the first image capturing information includes spatial coordinate information and/or orientation information. Then, the AR anchor may be displayed in a viewing frame 300 of the terminal device 100 according to the AR anchor information. In the embodiment, the AR anchor may include an AR viewing indicating frame 200, so the terminal device may start the camera device of the terminal device 100 to acquire a target scene 400 in response to detecting that the viewing frame 300 matches the AR viewing indicating frame 200.

Figure 10:
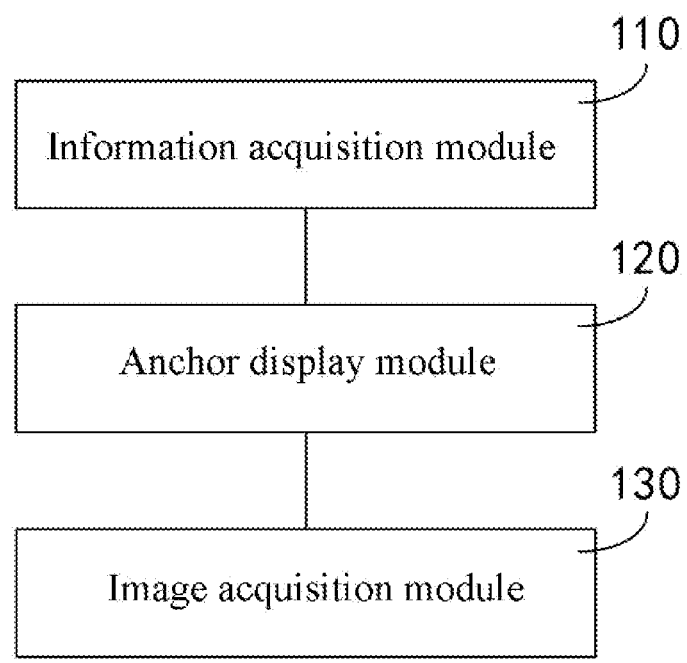
FIG. 10 is a block diagram showing an image acquisition device according to an exemplary embodiment.

FIG. 10 is a block diagram showing an image acquisition device according to an exemplary embodiment. The image acquisition device of the embodiment may be applied to a terminal device (for example, a smart phone, a smart camera, a tablet computer, a wearable device and the like). As shown in FIG. 10, the device includes an information acquisition module 110, an anchor display module 120, and an image acquisition module 130.

The information acquisition module 110 is configured to acquire augmented reality (AR) anchor information in current scene in response to a first image acquisition instruction of a terminal device. An AR anchor to which the AR anchor information belongs is configured to indicate first image capturing information of a camera device when acquiring a sample image, and the first image capturing information includes spatial coordinate information and/or orientation information.

The anchor display module 120 is configured to display the AR anchor in a viewing frame of the terminal device according to the AR anchor information.

The image acquisition module 130 is configured to perform image acquisition according to the first image capturing information indicated by the AR anchor.

In an embodiment, the above first image capturing information may further include at least one of a filter type and a zoom factor.

As can be seen from the above description that, in the embodiment, augmented reality (AR) anchor information in current scene is acquired in response to a first image acquisition instruction of a terminal device, wherein an AR anchor to which the AR anchor information belongs is configured to indicate first image capturing information of a camera device when acquiring a sample image, and the first image capturing information includes spatial coordinate information and/or orientation information; the AR anchor is displayed in a viewing frame of the terminal device according to the AR anchor information; and then image acquisition may be performed according to the first image capturing information indicated by the AR anchor. Therefore, the AR anchor is displayed to a user when the user takes photos, which can assist the user in image acquisition according to the first image capturing information indicated by the AR anchor, and thus facilitates the user to acquire more beautiful images to meet the needs of the user for obtaining high-quality images.

Figure 11:
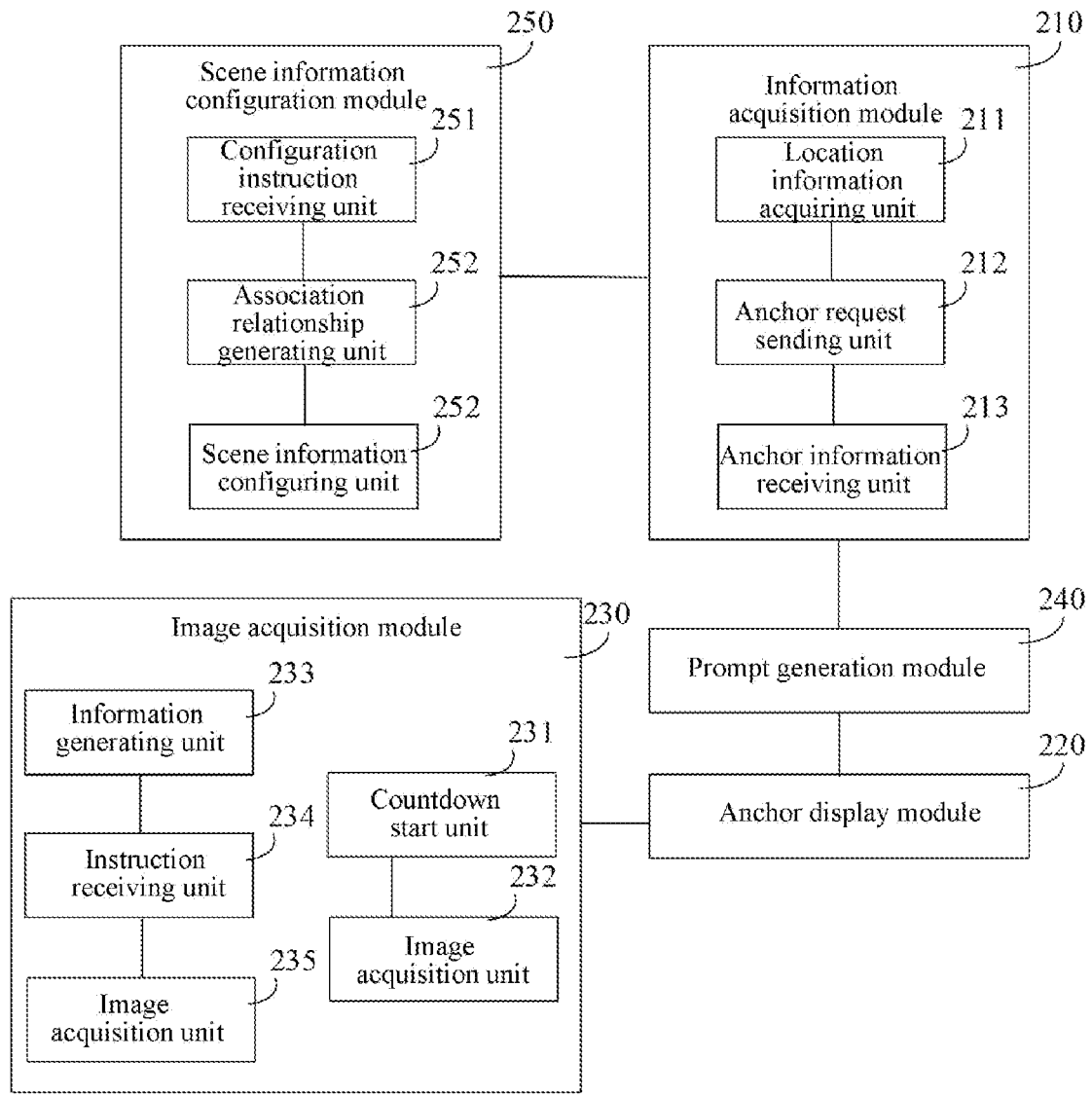
FIG. 11 is a block diagram showing another image acquisition device according to an exemplary embodiment.

FIG. 11 is a block diagram showing another image acquisition device according to an exemplary embodiment. The image acquisition device of the embodiment can be applied to a terminal device (for example, a smart phone, a smart camera, a tablet computer, a wearable device and the like). The functions of the information acquisition module 210, the anchor display module 220, and the image acquisition module 230 are the same as that of the information acquisition module 110, the anchor display module 120, and the image acquisition module 130 in the embodiment shown in FIG. 10, and will not be described in detail herein. As shown in FIG. 11, in the embodiment, the AR anchor includes an AR viewing indicating frame.

The image acquisition module 230 is further configured to start the camera device of the terminal device to perform the image acquisition in response to detecting that the viewing frame matches the AR viewing indicating frame.

In an embodiment, the image acquisition module 230 may include:

a countdown start unit 231, configured to start a countdown of a preset time duration in response to detecting that second image capturing information of the terminal device matches the first image capturing information, the second image capturing information including spatial coordinate information and/or orientation information of a camera device of the terminal device; and an image acquisition unit 232, configured to acquire image information in the viewing frame of the terminal device after the countdown ends.

In an embodiment, the image acquisition module 230 may include:

an information generating unit 233, configured to generate image acquisition reminding information in response to detecting that second image capturing information of the terminal device matches the first image capturing information;

an instruction receiving unit 234, configured to receive a second image acquisition instruction returned according to the image acquisition reminding information; and an image acquisition unit 235, configured to start the camera device of the terminal device to perform the image acquisition in response to the second image acquisition instruction.

In an embodiment, the image acquisition reminding information may include at least one of sound, vibration, highlighting a camera key, and displaying the camera key at a preset position.

In an embodiment, the device may further include:

a prompt generation module 240, configured to generate prompt information, the prompt information being configured to inquire whether to display the AR anchor.

The anchor display module 230 may be further configured to perform the operation of displaying the AR anchor in the viewing frame of the terminal device according to the AR anchor information in response to receiving a display instruction for displaying the AR anchor.

In an embodiment, the information acquisition module 210 may include:

a location information acquiring unit 211, configured to acquire scene information of the current scene where the terminal device is located, the scene information including geographic location information;

an anchor request sending unit 212, configured to send a request for obtaining the AR anchor information to a server side, the request including the scene information; and an anchor information receiving unit 213, configured to receive the AR anchor information returned by the server side according to the request.

In an embodiment, the scene information may further include at least one of time, light intensity information, and data stream of the viewing frame.

The AR anchor information includes at least one of AR anchor display form, identifier of application package to be jumped to, display coordinate of the AR anchor in the viewing frame, prompt manner, and reminding manner of displaying image acquisition.

In an embodiment, the device may further include a scene information configuration module 250.

The scene information configuration module 250 may include:

a configuration instruction receiving unit 251, configured to receive a scene configuration instruction, the configuration instruction being configured to configure the scene information for acquiring the AR anchor information;

an association relationship generating unit 252, configured to generate an association relationship between each piece of the scene information and the AR anchor information according to the configuration instruction; and a scene information configuring unit 253, configured to configure the scene information according to the association relationship.

Figure 12:
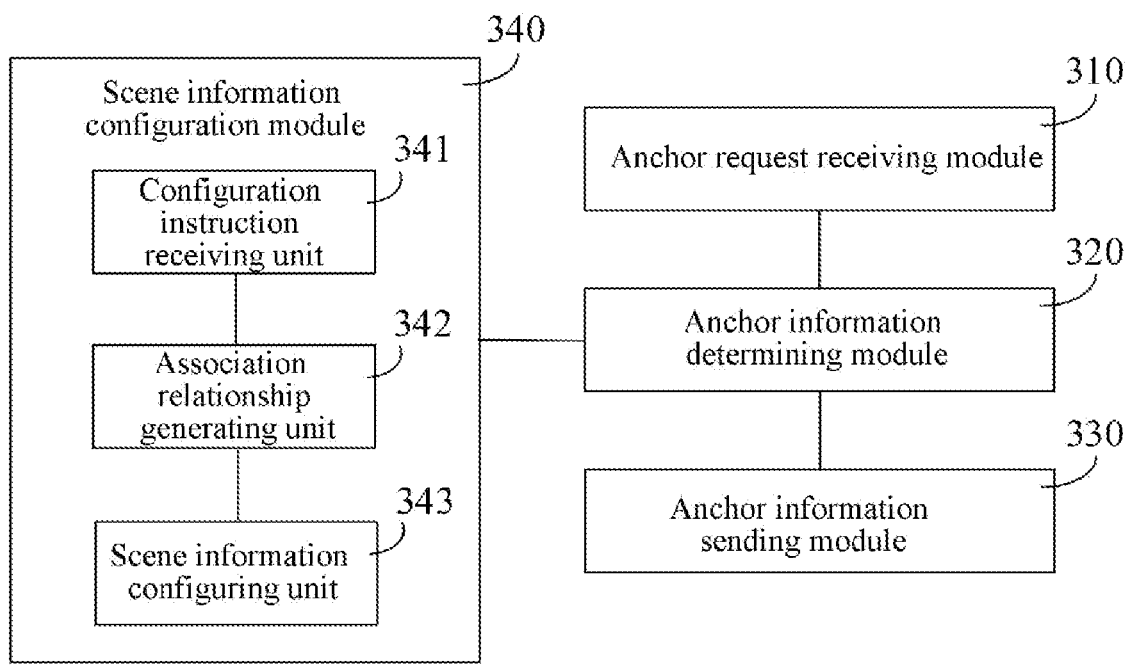
FIG. 12 is a block diagram showing yet another image acquisition device according to an exemplary embodiment.

FIG. 12 is a block diagram showing another image acquisition device according to an exemplary embodiment. The image acquisition device of the embodiment can be applied to a server side (for example, a server, or a server cluster including a plurality of servers). As shown in FIG. 12, the device includes:

an anchor request receiving module 310, configured to receive a request sent by a terminal device for obtaining AR anchor information, the request including scene information of a current scene where the terminal device is located, and the scene information including geographic location information;

an anchor information determining module 320, configured to determine the AR anchor information associated with the scene information, an AR anchor to which the AR anchor information belongs being configured to indicate first image capturing information of a camera device when acquiring a sample image, and the first image capturing information including spatial coordinate information and/or orientation information; and an anchor information sending module 330, configured to send the AR anchor information to the terminal device.

In an embodiment, the above device may further include a scene information configuration module 340.

The scene information configuration module 340 may include:

a configuration instruction receiving unit 341, configured to receive a scene configuration instruction, the configuration instruction being configured to configure the scene information for acquiring the AR anchor information;

an association relationship generating unit 342, configured to generate an association relationship between each piece of the scene information and the AR anchor information according to the configuration instruction; and a scene information configuring unit 343, configured to configure the scene information according to the association relationship.

As can be seen from the above description, in the embodiment, a request sent by a terminal device for obtaining AR anchor information is received, the request including scene information of a current scene where the terminal device is located, and the scene information including geographic location information; the AR anchor information associated with the scene information is determined, an AR anchor to which the AR anchor information belongs being configured to indicate first image capturing information of a camera device when acquiring a sample image, and the first image capturing information including spatial coordinate information and/or orientation information; and then the AR anchor information sent to the terminal device, which can assist the user in performing image acquisition according to the first image capturing information indicated by the AR anchor, and thus facilitates the user to acquire more beautiful images to meet the needs of the user for obtaining high-quality images.

Figure 13:
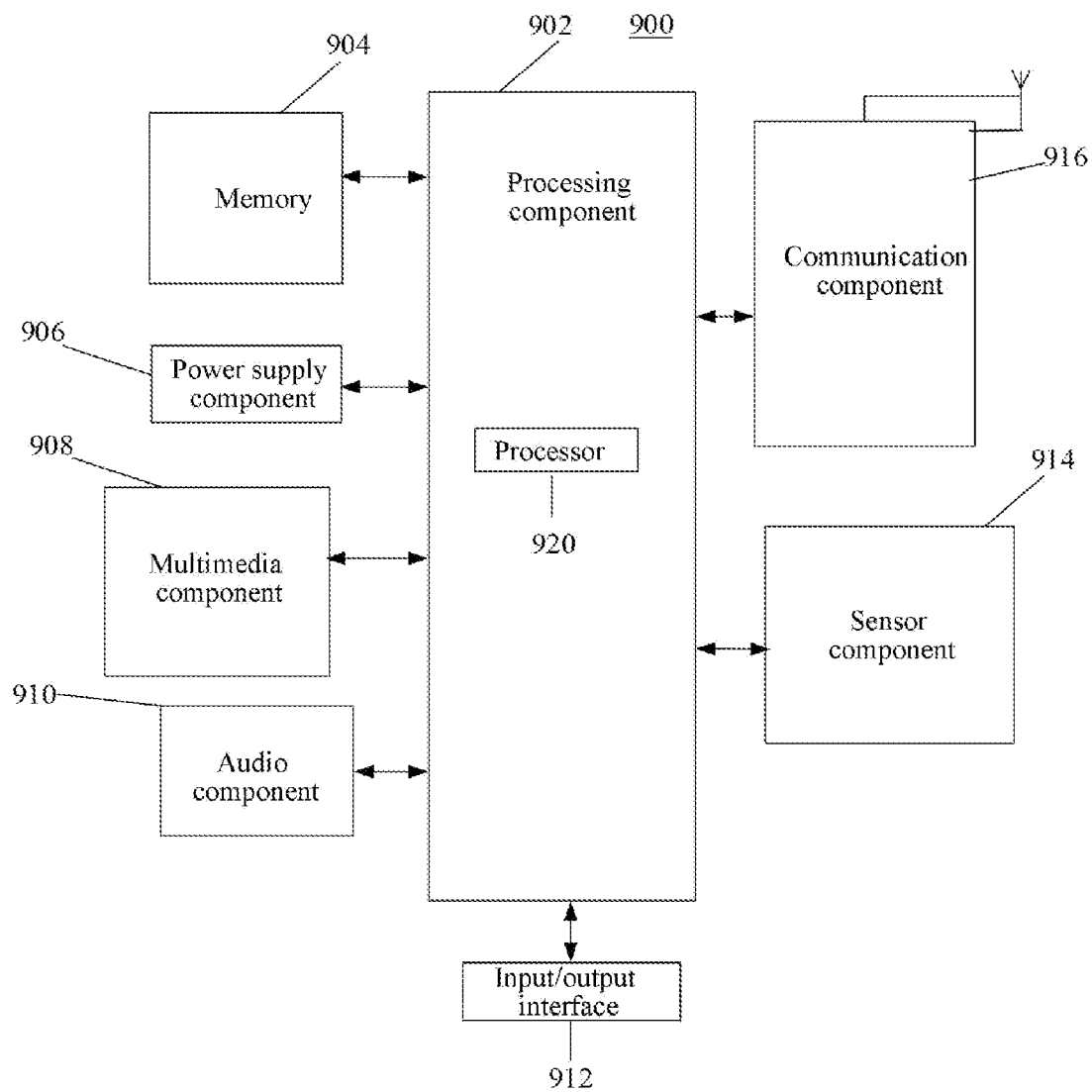
FIG. 13 is a block diagram showing an electronic apparatus according to an exemplary embodiment.

FIG. 13 is a block diagram showing an electronic apparatus according to an exemplary embodiment. For example, a device 900 may be a mobile phone, a computer, a digital broadcasting terminal, a messaging device, a game console, a tablet device, a medical device, a fitness device, a personal digital assistant and the like.

Referring to FIG. 13, the device 900 may include one or more of the following components: a processing component 902, a memory 904, a power supply component 906, a multimedia component 908, an audio component 910, an input/output (I/O) interface 912, a sensor component 914, and a communication component 916.

The processing component 902 generally controls the overall operations of the device 900, such as operations associated with display, telephone calls, data communications, camera operations, and recording operations. The processing element 902 may include one or more processors 920 to execute instructions to complete all or part of the steps of the foregoing method. In addition, the processing component 902 may include one or more modules to facilitate the interaction between the processing component 902 and other components. For example, the processing component 902 may include a multimedia module to facilitate the interaction between the multimedia component 908 and the processing component 902.

The memory 904 is configured to store various types of data to support the operation of the device 900. Examples of such data include instructions for any application or method operating on the device 900, contact data, phone book data, messages, pictures, videos and the like. The memory 904 may be implemented by any type of volatile or non-volatile storage device or a combination thereof, such as static random access memory (SRAM), electrically erasable and programmable read-only memory (EEPROM), erasable and programmable read-only memory (EPROM), programmable read-only memory (PROM), read-only memory (ROM), magnetic memory, flash memory, magnetic disk or optical disk.

The power supply component 906 provides power to various components of the device 900. The power supply component 906 may include a power management system, one or more power supplies, and other components associated with generating, managing, and distributing power for the device 900.

The multimedia component 908 includes a screen that provides an output interface between the device 900 and a user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touch, sliding, and gestures on the touch panel. The touch sensor may not only sense the boundary of a touch or sliding action, but also detect duration and pressure related to the touch or sliding operation. In some embodiments, the multimedia component 908 includes a front camera and/or a rear camera. When the device 900 is in an operation mode, such as a image capturing mode or a video mode, the front camera and/or the rear camera can receive external multimedia data. Each of the front camera and rear camera may be a fixed optical lens system or have focal length and optical zoom capabilities.

The audio component 910 is configured to output and/or input audio signals. For example, the audio component 910 includes a microphone (MIC). When the device 900 is in an operation mode, such as a call mode, a recording mode, and a voice recognition mode, the microphone is configured to receive external audio signals. The received audio signal may be further stored in the memory 904 or transmitted via the communication component 916. In some embodiments, the audio component 910 further includes a speaker for outputting audio signals.

The I/O interface 912 provides an interface between the processing component 902 and a peripheral interface module. The peripheral interface module may be a keyboard, a click wheel, a button, and the like. These buttons may include but are not limited to: a home button, a volume button, a start button, and a lock button.

The sensor component 914 includes one or more sensors for providing the device 900 with various aspects of state assessment. For example, the sensor component 914 can detect on/off status of the device 900 and relative positioning of components such as display and keypad of the device 900, and the sensor component 914 can also detect position change of the device 900 or a component of the device 900, presence or absence of contact between the user and the device 900, orientation or acceleration/deceleration of the device 900, and temperature change of the device 900. The sensor component 914 may also include a proximity sensor configured to detect the presence of nearby objects when there is no physical contact. The sensor component 914 may also include a light sensor, such as a CMOS or CCD image sensor, for use in imaging applications. In some embodiments, the sensor component 914 may also include an acceleration sensor, a gyroscope sensor, a magnetic sensor, a pressure sensor or a temperature sensor.

The communication component 916 is configured to facilitate wired or wireless communication between the device 900 and other devices. The device 900 can access a wireless network based on a communication standard, such as WiFi, 2G or 3G, 4G or 5G, or a combination thereof. In an exemplary embodiment, the communication component 916 receives a broadcast signal or broadcast related information from an external broadcast management system via a broadcast channel. In an exemplary embodiment, the communication component 916 further includes a near field communication (NFC) module to facilitate short-range communication. For example, the NFC module may be implemented based on radio frequency identification (RFID) technology, infrared data association (IrDA) technology, ultra-wideband (UWB) technology, Bluetooth (BT) technology and other technologies.

In an exemplary embodiment, the device 900 may be implemented by one or more application specific integrated circuits (ASICs), digital signal processors (DSP), digital signal processing devices (DSPDs), programmable logic devices (PLDs), field programmable gate arrays (FPGAs), controllers, microcontrollers, microprocessors or other electronic components to implement the above-mentioned image acquisition method.

In an exemplary embodiment, there is further provided a non-transitory computer-readable storage medium including instructions, such as the memory 904 including instructions, which can be executed by the processor 920 of the device 900 to implement the image acquisition method described above. For example, the non-transitory computer-readable storage medium may be ROM, random access memory (RAM), CD-ROM, magnetic tape, floppy disk, optical data storage device and the like.

After considering the specification and practicing the present disclosure disclosed herein, those skilled in the art will easily conceive of other embodiments of the present disclosure. The application is intended to cover any variations, uses, or adaptive changes of the present disclosure, which follow the general principle of the present disclosure and include the common knowledge or conventional technical means in the technical field not disclosed in the present disclosure. The description and the embodiments are to be regarded as exemplary only, and the true scope and spirit of the present disclosure areed out by the following claims.

It should be understood that the present disclosure is not limited to the precise structure that has been described above and shown in the drawings, and various modifications and changes can be made without departing from the scope thereof. The scope of the present disclosure is limited only by the appended claims.

What is claimed is:

1. An image acquisition method, applied to a terminal device with a cameral device, wherein the method comprises:
   acquiring augmented reality (AR) anchor information in a current scene where the terminal device is currently located in response to a first image acquisition instruction of the terminal device;
   displaying an AR anchor in a viewing frame of the terminal device according to the AR anchor information; and
   performing image acquisition according to first image capturing information indicated by the AR anchor to obtain a current image of the current scene, wherein the AR anchor to which the AR anchor information belongs is configured to indicate the first image capturing information, the first image capturing information is information with which another camera device previously captured a sample image of the current scene, and the first image capturing information comprises at least one of spatial coordinate information or orientation information of said another camera device when capturing the sample image of the current scene, and wherein the current image and the sample image are captured with the same first image capturing information.

2. The method according to claim 1, wherein the first image capturing information further comprises at least one of a filter type and a zoom factor.

3. The method according to claim 1, wherein the AR anchor comprises an AR viewing indicating frame; and the performing image acquisition according to the first image capturing information indicated by the AR anchor comprises:

starting the camera device of the terminal device to perform the image acquisition in response to detecting that the viewing frame matches the AR viewing indicating frame.

4. The method according to claim 1, wherein the performing image acquisition according to the first image capturing information indicated by the AR anchor comprises:

starting a countdown of a preset time duration in response to detecting that second image capturing information of the terminal device matches the first image capturing information; and acquiring image information in the viewing frame of the terminal device after the countdown ends.

5. The method according to claim 1, wherein the performing image acquisition according to the first image capturing information indicated by the AR anchor comprises:

generating image acquisition reminding information in response to detecting that second image capturing information of the terminal device matches the first image capturing information;

receiving a second image acquisition instruction returned according to the image acquisition reminding information; and starting the camera device of the terminal device to perform the image acquisition in response to the second image acquisition instruction.

6. The method according to claim 5, wherein the image acquisition reminding information comprises at least one of sound, vibration, highlighting a camera key, and displaying the camera key at a preset position.

7. The method according to claim 1, wherein the method further comprises:

generating prompt information, the prompt information being configured to inquire whether to display the AR anchor; and performing the operation of displaying the AR anchor in the viewing frame of the terminal device according to the AR anchor information in response to receiving a display instruction for displaying the AR anchor.

8. The method according to claim 1, wherein the acquiring augmented reality (AR) anchor information in current scene comprises:

acquiring scene information of the current scene where the terminal device is located, wherein the scene information comprises geographic location information;

sending a request for obtaining the AR anchor information to a server side, wherein the request comprises the scene information; and receiving the AR anchor information returned by the server side according to the request.

9. The method according to claim 8, wherein the scene information further comprises at least one of time, light intensity information, and data stream of the viewing frame; and the AR anchor information comprises at least one of AR anchor display form, identifier of application package to be jumped to, display coordinate of the AR anchor in the viewing frame, prompt manner, and reminding manner of displaying image acquisition.

10. The method according to claim 8, wherein the method further comprises configuring the scene information according to steps of:

receiving a scene configuration instruction, wherein the configuration instruction is configured to configure the scene information for acquiring the AR anchor information;

generating an association relationship between each piece of the scene information and the AR anchor information according to the configuration instruction; and configuring the scene information according to the association relationship.

11. An electronic apparatus implementing the method according to claim 1, comprising the camera device, and a display screen configured to display the AR anchor to a user when the user takes photos, thereby assisting the user in image acquisition according to the first image capturing information indicated by the AR anchor to obtain images with improved quality.

12. An electronic apparatus, applied to a terminal device with a cameral device, wherein the electronic apparatus comprises:

a processor; and memory for storing executable instructions that, when being executed by the processor, cause the processor to implement an image acquisition method comprising:

acquiring augmented reality (AR) anchor information in a current scene where the terminal device is currently located in response to a first image acquisition instruction of the terminal device;

displaying an AR anchor in a viewing frame of the terminal device according to the AR anchor information; and performing image acquisition according to first image capturing information indicated by the AR anchor to obtain a current image of the current scene, wherein the AR anchor to which the AR anchor information belongs is configured to indicate the first image capturing information, the first image capturing information is information with which another camera device previously captured a sample image of the current scene, and the first image capturing information comprises at least one of spatial coordinate information or orientation information of said another camera device when capturing the sample image of the current scene, and wherein the current image and the sample image are captured with the same first image capturing information.

13. The electronic apparatus according to claim 12, wherein the first image capturing information further comprises at least one of a filter type and a zoom factor.

14. The electronic apparatus according to claim 12, wherein the AR anchor comprises an AR viewing indicating frame; and the performing image acquisition according to the first image capturing information indicated by the AR anchor comprises:
starting the camera device of the terminal device to perform the image acquisition in response to detecting that the viewing frame matches the AR viewing indicating frame.

15. The electronic apparatus according to claim 12, wherein the performing image acquisition according to the first image capturing information indicated by the AR anchor comprises:

starting a countdown of a preset time duration in response to detecting that second image capturing information of the terminal device matches the first image capturing information; and
acquiring image information in the viewing frame of the terminal device after the countdown ends.

16. The electronic apparatus according to claim 12, wherein the performing image acquisition according to the first image capturing information indicated by the AR anchor comprises:

generating image acquisition reminding information in response to detecting that second image capturing information of the terminal device matches the first image capturing information;
receiving a second image acquisition instruction returned according to the image acquisition reminding information; and
starting the camera device of the terminal device to perform the image acquisition in response to the second image acquisition instruction.

17. The electronic apparatus according to claim 16, wherein the image acquisition reminding information comprises at least one of sound, vibration, highlighting a camera key, and displaying the camera key at a preset position.

18. The electronic apparatus according to claim 12, wherein the method further comprises:

generating prompt information, the prompt information being configured to inquire whether to display the AR anchor; and
performing the operation of displaying the AR anchor in the viewing frame of the terminal device according to the AR anchor information in response to receiving a display instruction for displaying the AR anchor.

19. The electronic apparatus according to claim 12, wherein the acquiring augmented reality (AR) anchor information in current scene comprises:

acquiring scene information of the current scene where the terminal device is located, wherein the scene information comprises geographic location information;
sending a request for obtaining the AR anchor information to a server side, wherein the request comprises the scene information; and
receiving the AR anchor information returned by the server side according to the request; and
wherein
the scene information further comprises at least one of time, light intensity information, and data stream of the viewing frame; and
the AR anchor information comprises at least one of AR anchor display form, identifier of application package to be jumped to, display coordinate of the AR anchor in the viewing frame, prompt manner, and reminding manner of displaying image acquisition.

20. A non-transitory computer-readable storage medium having a computer program stored thereon for execution by a processor to cause a terminal device with a camera device to implement:

acquiring augmented reality (AR) anchor information in a current scene where the terminal device is currently located in response to a first image acquisition instruction of the terminal device;
displaying an AR anchor in a viewing frame of the terminal device according to the AR anchor information; and
performing image acquisition according to first image capturing information indicated by the AR anchor to obtain a current image of the current scene,
wherein the AR anchor to which the AR anchor information belongs is configured to indicate the first image capturing information, the first image capturing information is information with which another camera device previously captured a sample image of the current scene, and the first image capturing information comprises at least one of spatial coordinate information or orientation information of said another camera device when capturing the sample image of the current scene, and
wherein the current image and the sample image are captured with the same first image capturing information.

* * * * *